US009114585B2

(12) United States Patent
Schmett et al.

(10) Patent No.: US 9,114,585 B2
(45) Date of Patent: Aug. 25, 2015

(54) METHOD AND DEVICE FOR INSERTING INSERTS (CORES) INTO FEMALE MOLDS OF A ROTARY TABLETING PRESS

(75) Inventors: Michael Schmett, Groβ Glienicke (DE); Wolfgang Korsch, Berlin (DE); Helmut Zeddies, Berlin (DE); Stephan Mies, Berlin (DE)

(73) Assignee: KORSCH AG, Berlin (DE)

( * ) Notice: Subject to any disclaimer, the term of this patent is extended or adjusted under 35 U.S.C. 154(b) by 986 days.

(21) Appl. No.: 12/424,540

(22) Filed: Apr. 16, 2009

(65) Prior Publication Data

US 2009/0260212 A1 Oct. 22, 2009

(30) Foreign Application Priority Data

Apr. 18, 2008 (DE) ........................ 10 2008 020 758

(51) Int. Cl.
*B29C 43/08* (2006.01)
*B30B 11/34* (2006.01)
*B30B 11/08* (2006.01)

(52) U.S. Cl.
CPC ................ *B30B 11/34* (2013.01); *B30B 11/08* (2013.01); *Y10T 29/49826* (2015.01); *Y10T 29/53* (2015.01)

(58) Field of Classification Search
CPC ................................ B30B 11/08; B30B 11/34
USPC .............. 425/110, 123, 126.1, 344–345, 804; 264/109–112
See application file for complete search history.

(56) References Cited

U.S. PATENT DOCUMENTS

| | | | | |
|---|---|---|---|---|
| 2,879,724 | A | 3/1959 | Wyatt et al. | |
| 2,946,298 | A * | 7/1960 | Doepel et al. | 425/345 |
| 2,963,993 | A * | 12/1960 | Stott | 425/345 |
| 3,872,203 | A | 3/1975 | Yoshikawa et al. | |
| 4,011,039 | A * | 3/1977 | Oas et al. | 425/397 |
| 5,088,915 | A * | 2/1992 | Korsch et al. | 425/345 |
| 5,256,046 | A * | 10/1993 | Korsch et al. | 425/345 |
| 5,376,313 | A * | 12/1994 | Kanewske et al. | 264/1.1 |
| 6,176,699 | B1 * | 1/2001 | Franjo et al. | 425/528 |
| 6,527,537 | B2 * | 3/2003 | Arndt et al. | 425/345 |
| 2003/0072799 | A1 | 4/2003 | Sowden et al. | |

FOREIGN PATENT DOCUMENTS

| | | | |
|---|---|---|---|
| DE | 1023191 | | 1/1958 |
| DE | 38 19 821 | C2 | 12/1989 |
| DE | 10026731 | A1 | 11/2001 |
| DE | 103 21 754 | B4 | 12/2004 |
| DE | 102007039043 | A1 | 2/2009 |
| EP | 1155811 | A2 | 11/2001 |
| GB | 845 033 | A | 8/1960 |
| JP | 59120399 | A | 7/1984 |
| JP | 59 144598 | A | 8/1984 |
| JP | 59 144599 | A | 8/1984 |

* cited by examiner

*Primary Examiner* — Joseph S Del Sole
*Assistant Examiner* — Thukhanh T Nguyen
(74) *Attorney, Agent, or Firm* — Joyce von Natzmer Agris & von Natzmer LLP

(57) ABSTRACT

The invention relates to a method for inserting inserts (cores) into female molds of a rotary tableting press. The inserts are inserted individually into one female mold each of a rotating rotor of the rotary tableting press by separating the inserts from a nonspecific quantity by means of a feeder mechanism, feeding them to a core distributor and aligning them from there with the female molds in a precisely defined position and delivering the inserts to the female molds in this position.

11 Claims, 7 Drawing Sheets

METHOD AND DEVICE FOR INSERTING INSERTS (CORES) INTO FEMALE MOLDS OF A ROTARY TABLETING PRESS

CROSS REFERENCE TO RELATED APPLICATION

This application claims priority of and incorporates by reference German patent application no. 10 2008 020 758.6 filed Apr. 18, 2008.

BACKGROUND

It is known that multilayer tablets can be produced with rotary tableting presses. Such tablets usually comprise two or more layers, which are subsequently pressed. For example, a corresponding number of filling devices with downstream pressure stations are arranged over the circumference of the rotor of the rotary tableting press.

It is also known that single-layer or multilayer tablets may be provided with a core or a so-called insert. These cores are fed individually to the female molds and are pressed into a medium, in particular a powder that is to be compressed, or they are sheathed by such a medium.

The decisive factor with such rotary tableting presses is that the cores are supplied individually and in a defined manner to one female mold each so that they can be introduced into the desired position, which is advantageously centered in the female mold.

DE 38 19 821 C2 discloses positioning such cores by means of a transfer star having rotating feeder arms whereby the cores are held on a holding area of the feeder arms by a vacuum, so they can be deposited by shutting off the vacuum.

Furthermore, it is known from DE 103 21 754 B4 that the cores may be positioned on a continuous conveyor and the continuous conveyor is entrained over a partial circle of the rotor of the tableting press and the cores are injected into the female molds by the upper ram of the tableting press. Entrainment of the cores over a partial circle of the rotor leads to complex measures for positioning the cores and synchronizing the movement of the cores and the female molds.

SUMMARY

One embodiment provides a method and a device of the generic type by means of which it is possible to reliably feed inserts (cores) into female molds of rotary tableting presses in an accurately targeted manner.

It is advantageously possible to achieve an accurately targeted positioning of the insert without entraining the insert over a partial circle of the rotor of the rotary tableting press because each insert is inserted individually as single feed into a female mold in a rotating rotor of the rotary tableting press by separating the inserts out of an indefinite quantity of inserts by means of a feeder device, feeding the inserts to a core distributor and directing the inserts from there into the female molds in a precisely defined position, so that in this position the inserts are deposited into the female molds.

It is advantageously possible to feed the inserts individually to the female molds in a targeted manner because the feeder mechanism comprises a core distributor and the core distributor has a drivable rotor comprising at least one core receptacle over its circumference, and the path of movement of the at least one core receptacle and the path of movement of the female molds of the rotary tableting press intersect in a partial circle, such that the at least one core receptacle comprises retaining means which allow the inserts to be received, conveyed and delivered. Transfer and/or insertion of the inserts (cores) into the female molds is accomplished at a defined point within the area in which the paths of movement of the core receptacles and female molds intersect. The device for inserting the inserts may thus be designed as an additional module for rotary tableting presses and is to be adjusted once. The device is to be moved so far radially toward the rotor of the rotary tableting press that it results in intersection of the path of movement of the at least one core receptacle with the path of movement of the female molds at a defined point on the radials on which the device is aligned with respect to the rotor of the rotary tableting press.

In a preferred embodiment of the invention, the core receptacle comprises gripper elements for receiving the inserts, for centering the inserts, for conveying the inserts and for ejecting the inserts. This yields a very accurate and reliable feed of inserts (cores) to the female molds. Due to the multifunctionality of the gripper elements, the design of the feeder mechanism, in particular the core distributor is simple and robust.

In another preferred embodiment of the invention, the gripper elements are pneumatically controllable, with the core distributor preferably comprising a pneumatic connection, which is operatively connected to valves that serve to control the gripper elements. A very reliable and robust control of the gripper elements is made possible in this way.

In addition, in a preferred embodiment of the invention, the valves are controllable via a stationary control cam of the core distributor. This achieves the result that control of the valves is always accomplished securely and reliably at the correct point in time and can be coordinated with the inserts (cores) to be fed into the molds through the choice of control cam.

Furthermore, in a preferred embodiment of the invention, four valves are assigned to each gripper element, namely for opening and/or closing gripper tongs and for receiving and ejecting the inserts. The reliability of the feeder mechanism for the core distributor in particular is ensured by assigning each of the four valves to an individual function.

In addition, in a preferred embodiment, the rotor of the core distributor can be driven by a controllable drive, preferably by a stepping motor. This easily makes it possible to synchronize the rotational speed of the core distributor and the rotational speed of the rotor of the rotary tableting press. Very accurate positioning of the inserts (cores) in the female molds is thus made possible.

Furthermore, in a preferred embodiment of the invention, the feeder mechanism comprises a core feeder mechanism, which together with a core separator and the core distributor forms a feeder chain for the inserts (cores). A continuous supply of inserts from a storage supply having an indefinite number of inserts to the female molds is made possible in this way.

It is preferably provided that the core feeder mechanism comprises a rotatable conveyor which feeds the cores individually to the core distributor in a defined manner, whereby preferably the conveyor has positioning pockets for self-positioning of the single-fed inserts (cores). This advantageously makes it possible to first separate the inserts and bring them into a defined position, so that they can be received by the core distributor, in particular by the gripper tongs of the gripper elements of the core distributor in a precisely positioned manner, thereby ensuring that exactly one insert is received and this one insert is fed to the defined transfer position to the female mold.

The present invention thus proposes that the transfer of the cores and/or the preferably solid inserts in general into the female molds should be accomplished by means of a so-called core distributor. This core distributor has a rotor comprising over its circumference the desired number of core receptacles, e.g., 18. The core distributor and the female mold table of the tableting press intersect in a partial circle, so that the core receptacles may be brought into an accurately definable position above the female molds of the female mold table.

The core receptacles have gripper elements by means of which the cores can be received in a receiving position; the cores can be transported and can be delivered to the delivery position above the female molds. The grippers can preferably be driven pneumatically, so that the functions of the grippers, namely receiving the cores, centering the cores, transporting the cores and ejecting the cores, are possible by controlling corresponding valves.

The rotor of the core distributor is preferably driven electrically, e.g., by means of a servo motor. Thus, a rotational speed of the rotor of the core distributor can easily be synchronized with the rotational speed of the rotor and/or the female mold table of the tablet press. Other drives are also conceivable. For example, a mutually coordinated control may be accomplished here via incremental generators that are provided so that accurate positioning of the cores relative to the female molds is possible and these can thus be introduced into the female molds in a well-centered position.

BRIEF DESCRIPTION OF THE DRAWINGS

The invention is explained in greater detail below on the basis of the respective drawings, in which.

DETAILED DESCRIPTION OF THE DRAWINGS

Figure 1:
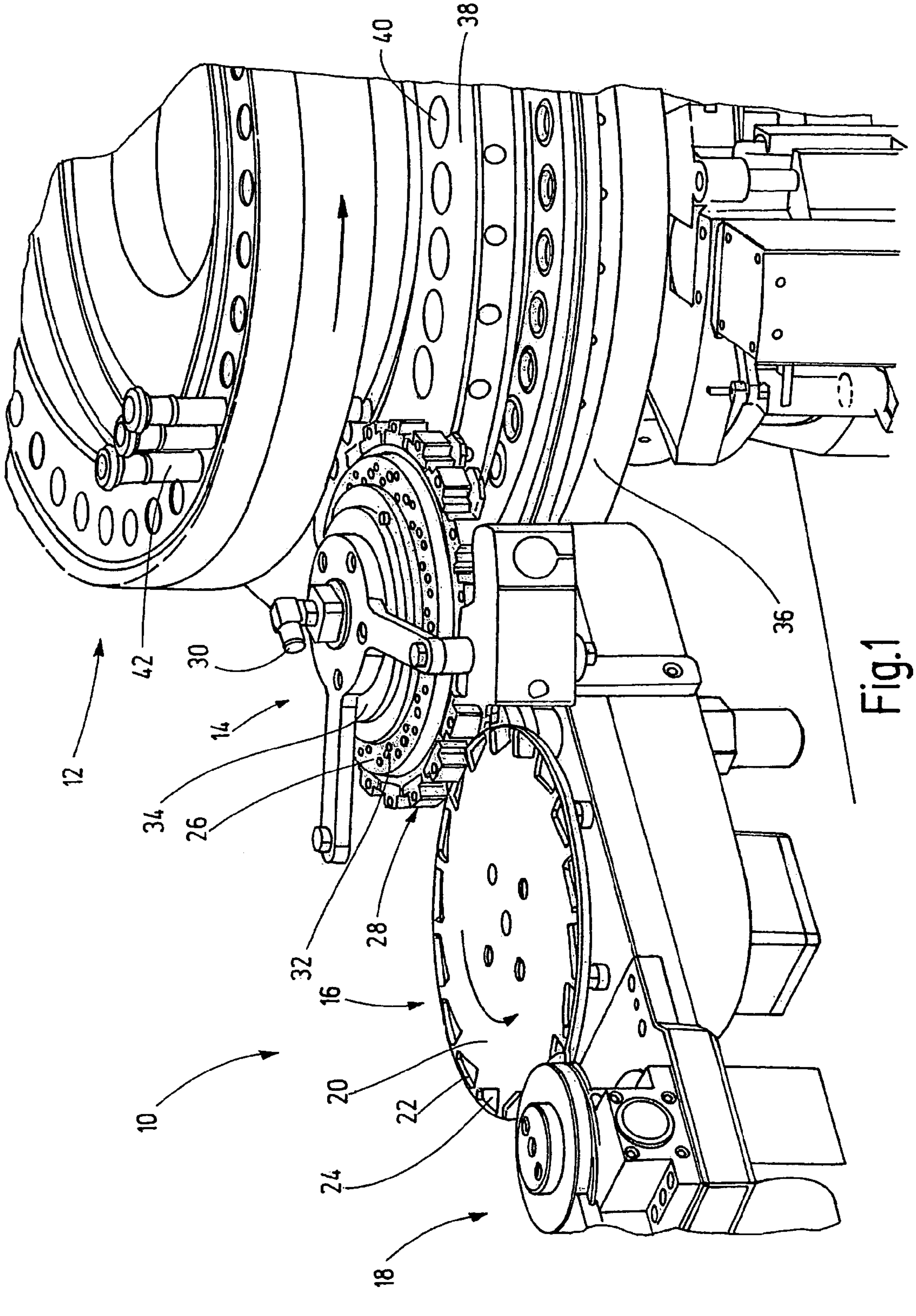
FIG. 1 shows a schematic perspective view of a feeder mechanism for cores/inserts to a tableting press.

FIG. 1 shows a perspective schematic view of a rotary tableting press labeled as 12 on the whole and having a feeder mechanism 10 for cores. The design and functioning of rotary tableting presses are known in general, so that they will not be discussed in detail within the scope of the present description.

The invention relates in particular to the feeder mechanism 10, which can be combined with a rotary tableting press 12.

The feeder mechanism 10 comprises a core distributor 14, a core feeder 16 and a core separator 18.

The core separator 18 feeds the cores individually, e.g., via a continuous conveyor, out of a storage container to the feeder mechanism 10. The cores are then transferred individually to the core feeder mechanism 16. The core feeder mechanism 16 comprises a rotary conveyor 20 having openings 22 on a circumferential line. Beneath the conveyor 20 is arranged a stationary guide surface 24, e.g., a disk or a ring arranged in the area of the opening 22. This forms conveyor pockets through the openings 22, into which the cores are inserted individually by the core separator 18. Exactly one core comes to lie in each of the openings 22 (pockets). Due to the shaping of the openings 22, as seen from above, the cores are placed in a precisely defined position during the conveyance movement of the cores. The cores are more or less pushed over the guide surface 24 and reach a positioning stop at the end of the openings 22, situated at the rear as seen in the direction of rotation. The direction of rotation is indicated by an arrow.

Figure 4:
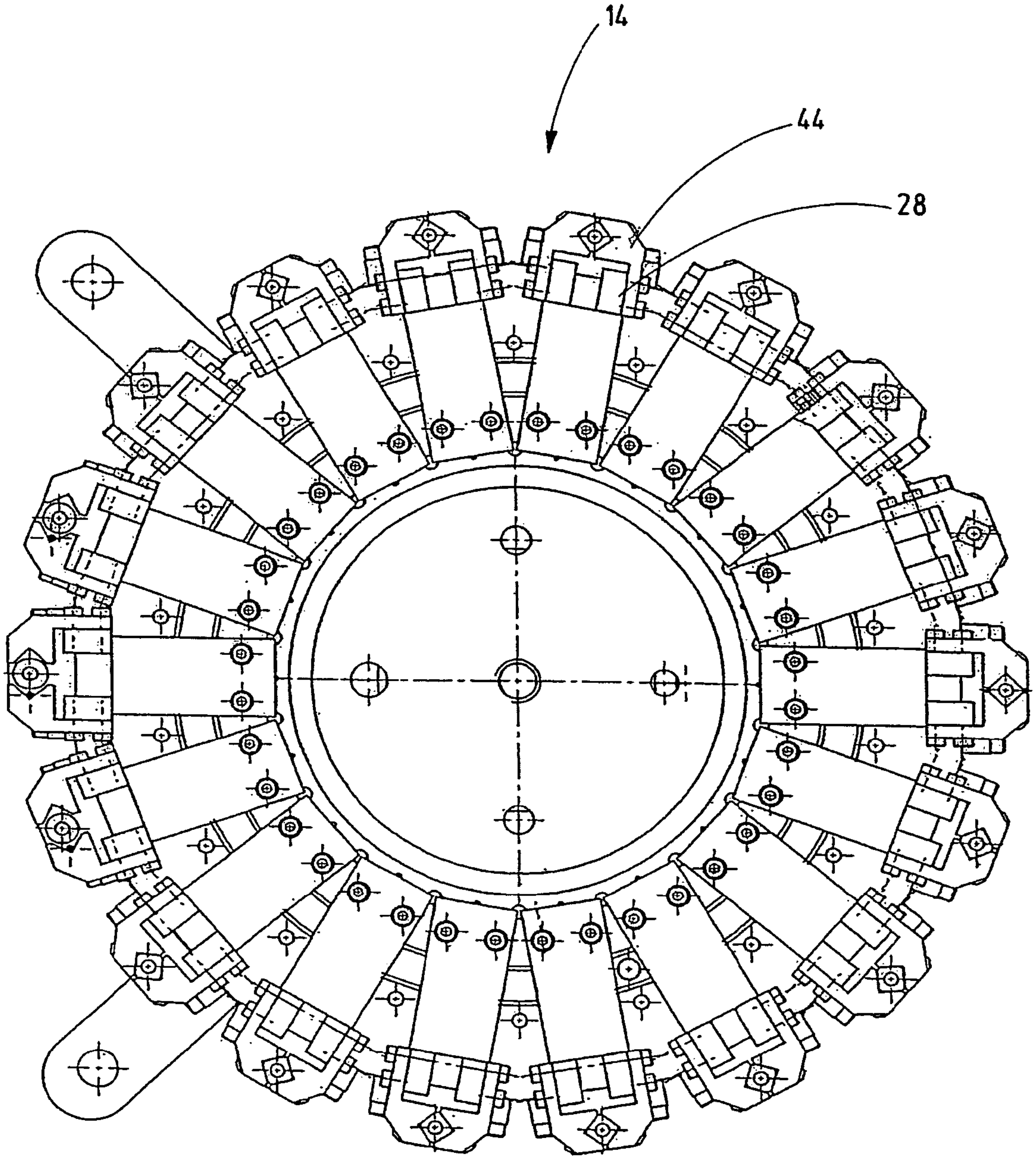
Figure 5:
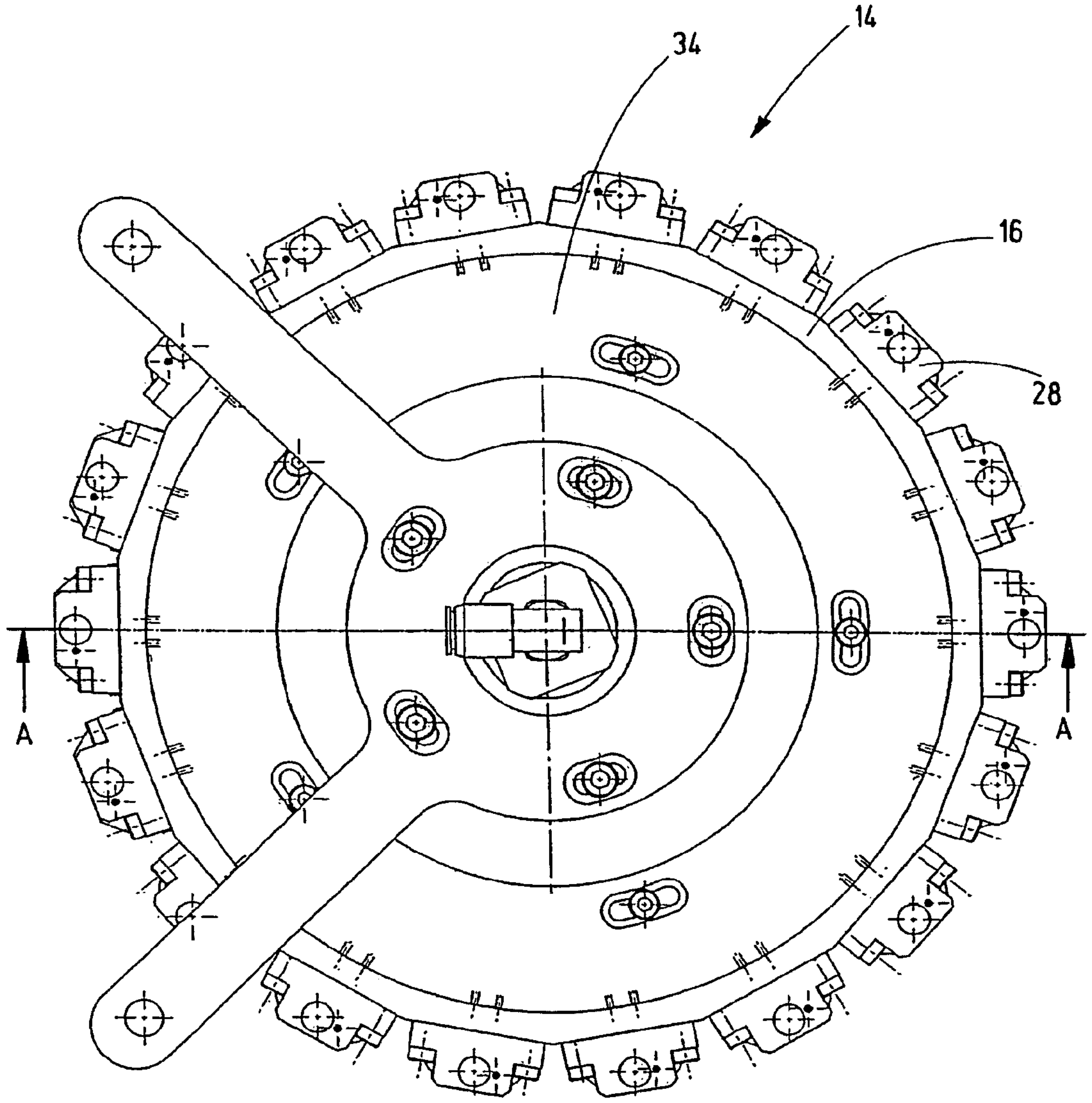
Figure 6:
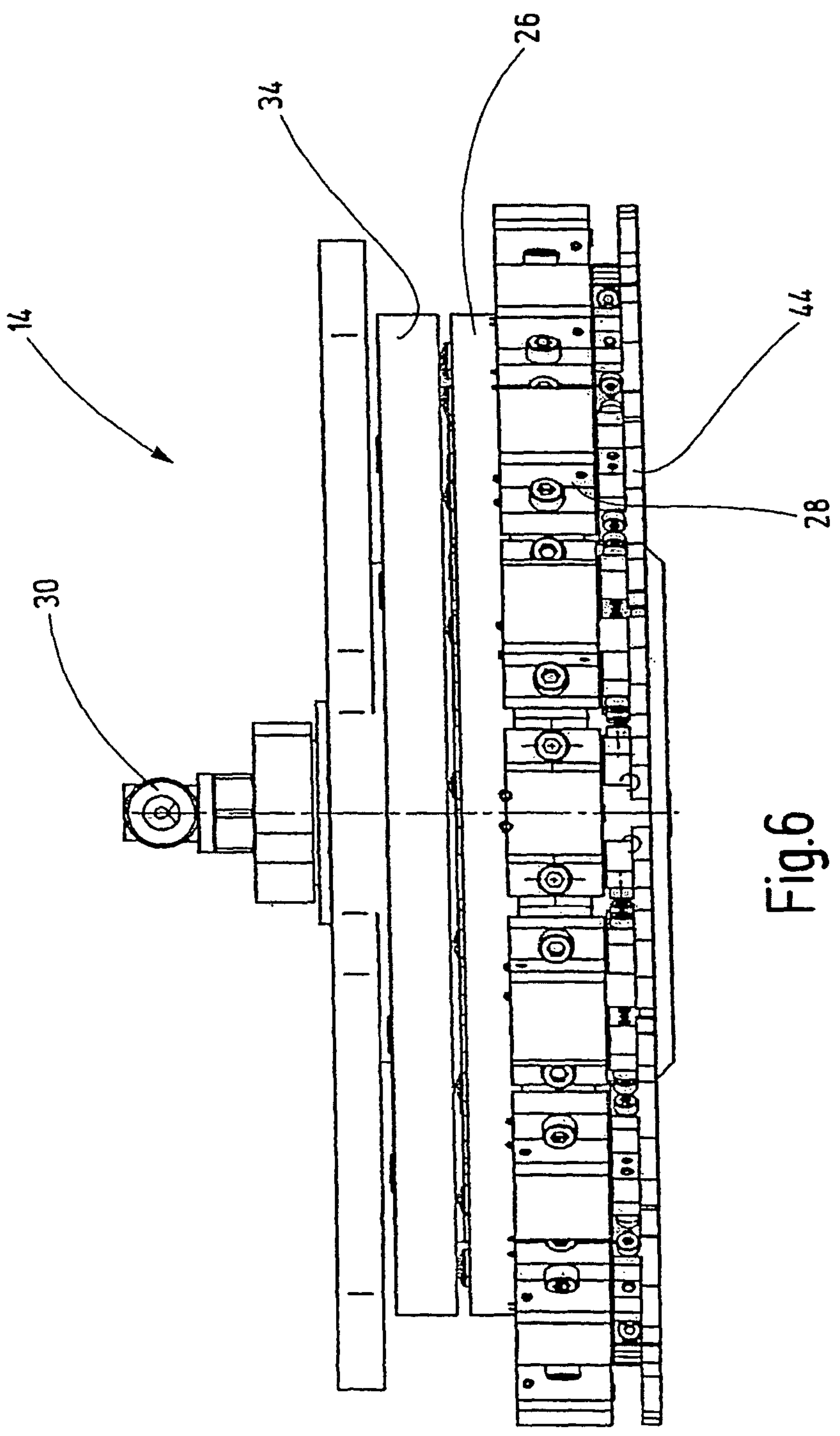
Figure 7:
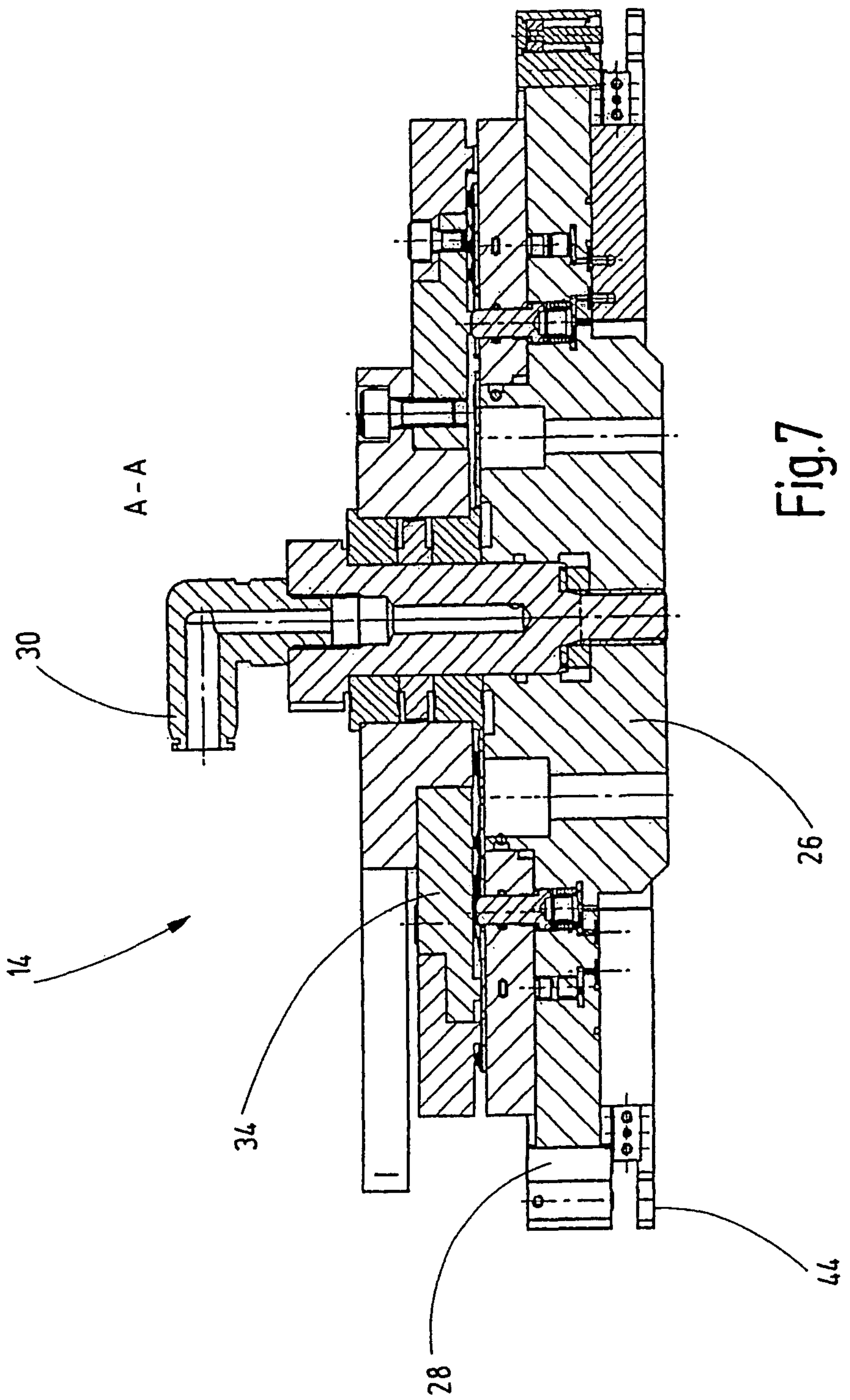

The core distributor 14 comprises a rotor 26 having gripper elements 28 over its circumference. The gripper elements 28 have tong-like grippers which are pneumatically controllable. A supply of compressed air to the core distributor 14 is accomplished here via a pneumatic connection 30 indicated here. The gripper elements 28 are operated via valves 32 which are arranged in the core distributor 14 and are controllable by control cams 34. A defined controlling of the valves 32 of the gripper elements 28 may thus be accomplished during the rotation of the rotor 26. Four control valves 32 are provided for each gripper element 28 and these in turn allow opening, closing of the grippers (gripper tongs 44 FIG. 4) and/or receiving and ejecting the cores.

The rotor 26 of the core distributor 14 is drivable by a controllable drive, which is not shown in detail here. This makes it possible to synchronize the rotational speed and/or the stepping speed at which the rotor 26 changes its position to the revolution of the rotor 36 of the rotary tableting press 12. The rotary tableting press 12 is known to comprise a female mold table 38 having female molds 40 arranged on a circumferential line. Each female mold 40 is assigned a lower ram and an upper ram, three upper rams 42 of which are indicated here schematically. The lifting movement of the upper and lower rams is implemented by cams in a known way, so that the female molds 40 are filled, the media filled into the female molds 40 are pressed and the finished tablets are ejected.

The diagram in FIG. 1 illustrates the fact that the core distributor 14 engages with the rotor 36, such that the rotor is arranged above the female mold table 38 and below the upper ram 42. The gripper elements 28 can be brought into correspondence with the female molds 40 in this way, without leading to interference with the rotational movement of the rotor 36 of the tableting press 12 and/or the rotational movement of the rotor 26 of the core distributor 14.

The arrangement illustrated in FIG. 1 has the following function:

The cores to be inserted into the female molds are fed by the core separator 18 to the core feeder mechanism 16. The cores are introduced individually into the openings 22 here and conveyed to the core distributor 14. In the area of the core distributor 14, the guide surface 24 is interrupted, so that the cores more or less drop down and can be picked up here by gripper tongs 44 of the gripper elements 28. The gripper tongs 44 form a receiving area which is adapted to the size and shape of the cores to be inserted. The gripper tongs 44 may be interchangeable, so that retooling to different core sizes and core shapes is possible with no problems.

Figure 2:
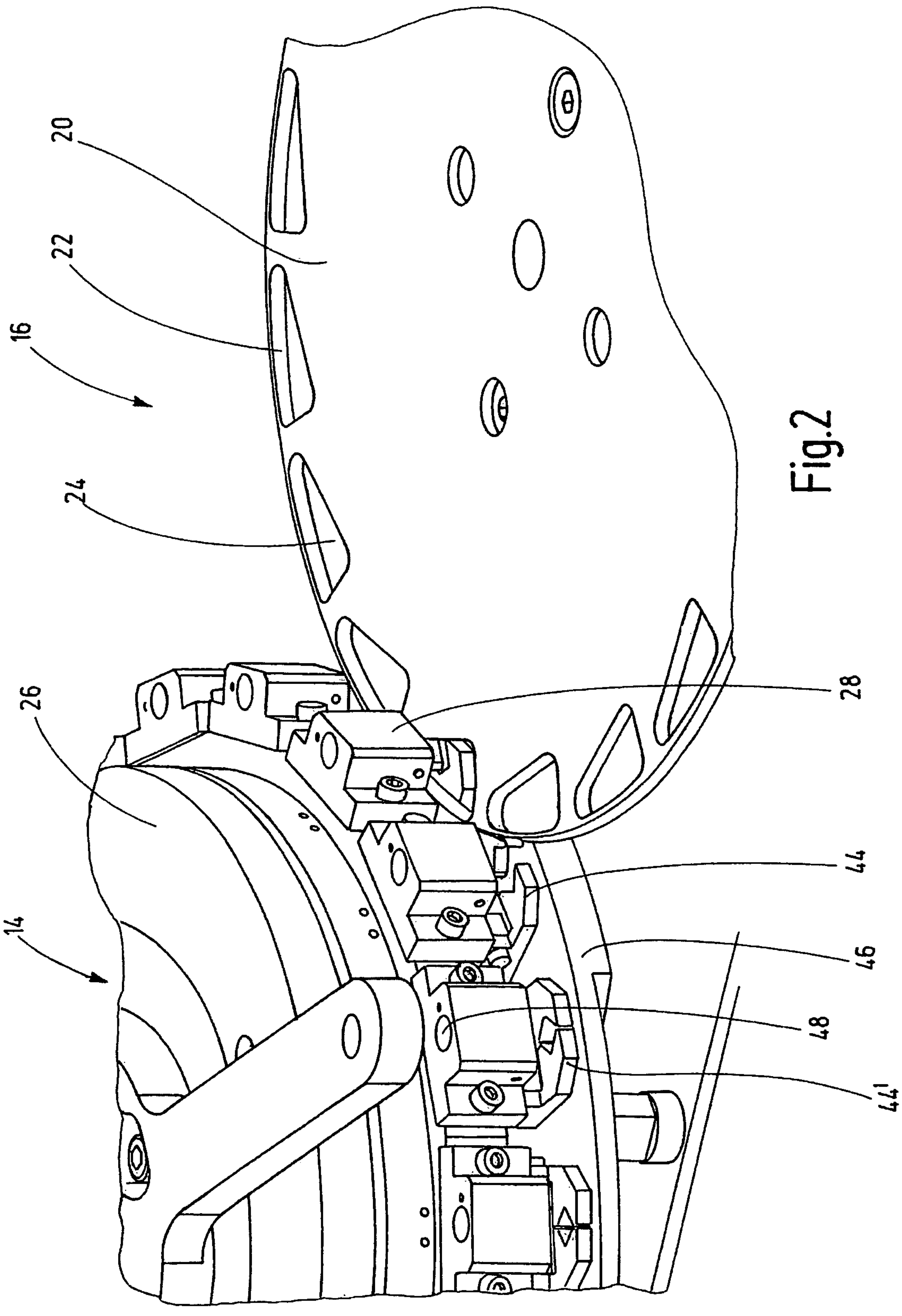
FIG. 2 shows a schematic perspective view of a receiving area of the core distributor and FIGS. 3 to 7 show a different view of the core distributor.
Figure 3:
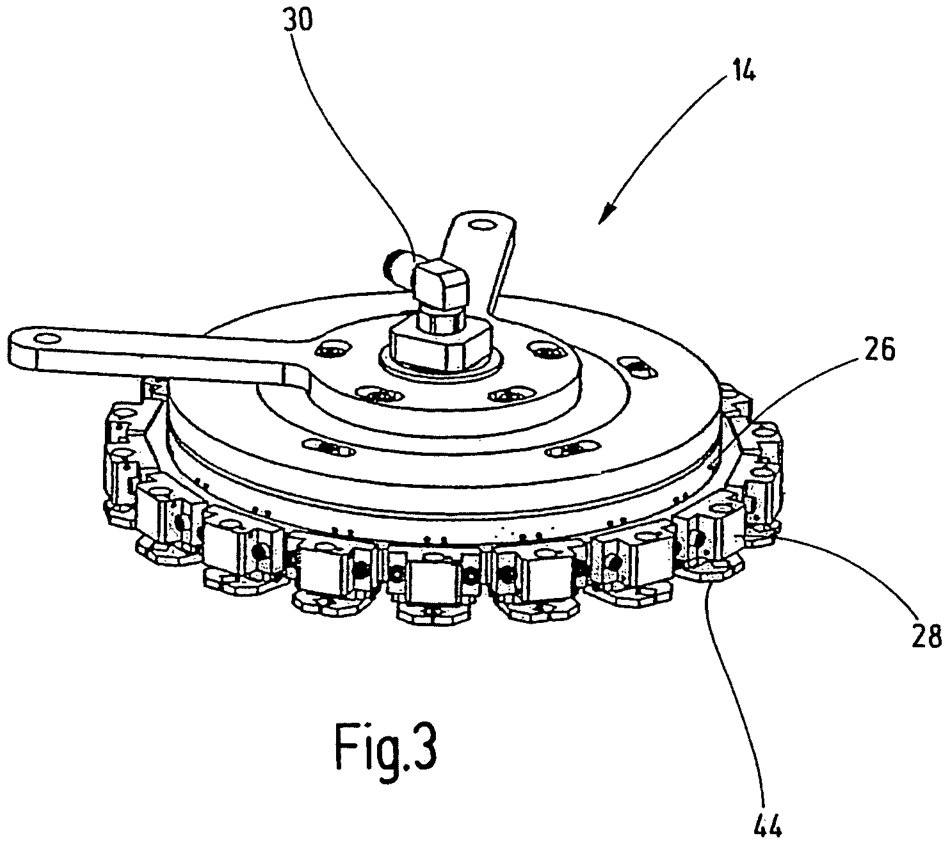

FIG. 2 illustrates the transfer area between the core feeder mechanism 16 and the core distributor 14. The rotor of the core distributor 14 has a stationary guide surface 46, which is perforated at least in the area of the transfer of the cores from the core feeder mechanism 16 and can be acted upon by a vacuum. The cores are more or less drawn by suction to the guide surface 46 in this way and held in that position. The gripper tongs 44 are closed over the control cams 34 by operating the respective pneumatic control valves 32 by means of the control cams 34 as indicated in FIG. 2 on the basis of the opened position 44 and the closed position 44'. The gripper tongs 44 then convey the cores into the area of the rotor 36 of the tableting press 12. The receiving area of the gripper tongs 44 is guided here over a female mold 40 rotating past it at the moment. If the receiving area of the gripper tongs 44 is situated over a female mold 40, then a plunger 48 which is situated above the receiving area of the gripper tongs 44 is controlled by the pneumatic control of the core distributor 14. This ejects the core downward out of the gripper tongs 44 into the corresponding female mold 40. The plunger 48 is also controlled by the control cam 34.

It is clear that for the arrangement of the core distributor 14, a continuous feed of cores to the female molds 40 is possible.

Due to the synchronized control of the core distributor 14 as well as the core feeder mechanism 16, a targeted and accurate feeding of one core each into one female mold 40 is possible with the drive control of the rotor 36 of the rotary tableting press with the cores being positioned centrally, i.e., in a precisely defined position in particular.

FIGS. 3 to 7 illustrates different views of the core distributor 14. It is clear here in particular that a number of gripper elements 28, namely 18 in this case, are arranged over the circumference of the rotor 26 in a star pattern. All these grippers can be controlled through a central compressed air connection 30 by means of four respective compressed air valves. Simple pneumatic control of the gripper elements 28 can thus be achieved by means of stationary control cams. This in particular permits a defined holding of the cores, secure conveyance and a defined delivery of the cores correlated with the individual female molds 40 in a reliable manner.

LIST OF REFERENCE NUMERALS

10 Feeder mechanism
12 Rotary tableting press
14 Core distributor
16 Core feeder mechanism
18 Core separator
20 Rotary conveyor
22 Opening
24 Stationary guide surface
26 Rotor of the core distributor 14
28 Gripper elements
30 Central compressed air connection
32 Control valves
34 Control cams
36 Rotor
38 Female mold table
40 Female mold
42 Upper rim
44 Gripper tongs
44' Closed position
46 Guide surface
48 Plunger

What is claimed is:

1. A device for inserting single-feed inserts into female molds in a rotary tableting press, comprising:
- a core feeder mechanism comprising a rotary conveyor comprising positioning pockets, wherein the pockets are configured to self-position the inserts,
- a core distributor having a drivable rotor comprising over its circumference at least one core receptacle configured to intersect with the female molds of the rotary tableting press-in a partial-circle, wherein the at least one core receptacle comprises:
  - a restrainer comprising gripper elements with gripper tongs configured to receive the inserts from the pockets in a receiving area of the pair of gripper tongs situated below the pockets, wherein the gripper tongs are further configured to insert, center and convey the inserts, and
  - at least one plunger attached to the core distributor situated above a receiving area of a pair of gripper tongs,
  - wherein the gripper tongs and the plunger are pneumatically controlled by a control cam, and
  - wherein the gripper elements are operated via pneumatic control valves which are arranged in the core distributor and are controllable by the control cam to eject the core downward out of the pair of said gripper tongs via said plunger.

2. The device according to claim 1, wherein the control cam is a stationary control cam.

3. The device according to claim 1, wherein four valves are assigned to each gripper element configured to open or close the gripper tongs and configured to receive and eject the inserts.

4. The device according to claim 1, further comprising a controllable drive operatively connected to the rotor of the core distributor.

5. The device according to claim 4, wherein the controllable drive is part of a stepping motor.

6. The device according to claim 1, further comprising a core separator wherein the core feeder mechanism, the core separator and the core distributor forms a feeder chain for the inserts.

7. The device according to claim 1, wherein the positioning pockets are elongated, comprise a positioning stop and are formed by the rotary conveyor and a guide surface positioned underneath the rotary conveyor.

8. The device according to claim 7, wherein the guide surface is interrupted at the core distributor.

9. A device for inserting single-feed inserts into female molds in a rotary tableting press, comprising:
- a core feeder mechanism comprising a rotary conveyor comprising positioning pockets, wherein said position pocket are elongated, comprise a positioning stop and are formed by the rotary conveyor and a guide surface positioned underneath the rotary conveyor and are configured to self-position the inserts at the positioning stop,
- a core distributor having a drivable rotor comprising over its circumference at least one core receptacle configured to intersect with the female molds of the rotary tableting press in a partial-circle, wherein the at least one core receptacle comprises:
  - a restrainer comprising gripper elements with gripper tongs configured to receive, insert, center and convey the inserts, and
  - at least one plunger attached to the core distributor situated above the receiving area of the pair of gripper tongs,
  - wherein the gripper tongs and plunger are pneumatically controlled by a control cam, and
  - wherein the gripper elements are operated via pneumatic control valves which are arranged in the core distributor and are controllable by the control cam to eject the core downward out of the pair of said gripper tongs via said plunger.

10. The device according to claim 9, wherein the guide surface comprises an interruption at the core distributor.

11. The device according to claim 10, wherein the interruption is located above the gripper tongs.

* * * * *